United States Patent [19]

Goulard et al.

[11] Patent Number: 4,501,489
[45] Date of Patent: Feb. 26, 1985

[54] MULTI-PARTITION MODULAR CAMERA FOR OBTAINING MICROFICHES

[75] Inventors: Claude Goulard, Meudon; Serge Accettella, Bourg-la-Reine; Gerárd Cathaly-Prétou, Fontenay-sur-Bois; Bernard Fages; Daniel Jeannin, both of Paris; Philippe Laloux, Neuilly-sur-Marne; Jean Le Fur, Pantin, all of France

[73] Assignee: Centre National de la Recherche Scientifique (CNRS), Paris, France

[21] Appl. No.: 471,724

[22] Filed: Mar. 3, 1983

[30] Foreign Application Priority Data

Mar. 4, 1982 [FR] France .................. 82 03570

[51] Int. Cl.³ .............................. G03B 27/44
[52] U.S. Cl. ........................... 355/54; 355/72
[58] Field of Search .............. 355/53, 54, 44, 45, 355/72

[56] References Cited

U.S. PATENT DOCUMENTS

| 2,763,182 | 9/1956 | Urban et al. ............... 88/24 |
| 3,261,259 | 7/1966 | Baptie et al. .............. 88/24 |
| 3,733,126 | 5/1973 | Brownscombe ............... 355/54 |
| 3,850,522 | 11/1974 | Vane et al. ................ 355/54 |
| 3,907,426 | 9/1975 | Goodliffe ................. 355/54 X |
| 3,953,123 | 4/1976 | Jesensky et al. .......... 355/54 X |
| 4,176,948 | 12/1979 | Spence-Bate ................ 355/53 |

FOREIGN PATENT DOCUMENTS

1597612 8/1970 France .
2430033 1/1980 France .

Primary Examiner—L. T. Hix
Assistant Examiner—Brian W. Brown
Attorney, Agent, or Firm—Cushman, Darby & Cushman

[57] ABSTRACT

A step wise drive system is mounted on a plate with a flat upper surface, in a light proof environment. The drive system drives a carriage via a motor actuating an endless screw which co-operates with the runner nut connected to the carriage. At the other end, the carriage comprises a motor which in turn co-operates with an endless screw acting on runner nut. The runner nut bears lateral slides connected to a film holder unit. Finally, the film holder unit is movable in a sliding fashion on a rail connected to the carriage. In this way, the film holder unit is connected to the second runner horizontally in X and Y directions and free vertically relative thereto. It can therefore slide on the upper surface of the plate with a dry fit, permitting excellent positioning of the microfiche for taking shots.

9 Claims, 11 Drawing Figures

FIG_1

FIG_2

FIG_3

FIG_6

FIG_7

FIG_8

MULTI-PARTITION MODULAR CAMERA FOR OBTAINING MICROFICHES

BACKGROUND OF THE INVENTION

1. Field of the Invention

The invention relates to a device for taking pictures, or a camera, for the production of microfiches.

Microfiches have become an important substrate for documents and comprise a rectangular sheet of photographic film containing one or more micro-images (which necessitate enlargement for observation) and a heading or title zone intended to receive identification and reference data which can be read by the naked eye. The arrangement of the micro-images in lines and columns on the microfiche is known as "partition".

2. Description of the Prior Art

Microfiche cameras have already been proposed, in particular in French Pat. No. 1,597,612. The currently known cameras for professional use (highly quality of reproduction) are specialised, that is to say they cannot be adapted to any particular photographic work without substantial modifications. This adaption necessitates, in particular:

easy exchange of partition, involving the various standardised, uniform or variable partitions or C.O.M. type partitions from paper documents;

The reproduction of already existing microfiches or "transposition" of films;

the possibility of passing from a single format to a double format of micro-images during the production of the same microfiche;

the ability to treat rolled film just as easily as film which has been precut to the format of the microfiches.

SUMMARY OF THE INVENTION

The present invention aims essentially to propose an improved modular camera which meets these various requirements in the best way using means which are as simple and reliable as possible and which are also economical to manufacture.

Basically, the proposed camera comprises a frame provided with a horizontal plate possessing a flat upper surface covered by a light-proof cover and, beneath the cover, with means for X-Y travel of a film holder unit over this plate, the film holder unit being capable of holding a photosensitive film in the vicinity of the upper surface of the plate, parallel thereto, and being movable in an indexed fashion so as to move the film above a shooting station arranged in the plate so as to permit impression on the film of a succession of elementary images arranged according to a partition selected from various elementary image partitions admissible in microfiches.

According to an important feature of the present invention, the means of X-Y travel comprise a longitudinal guide connected to the plate supporting one end of a transverse carriage of which the other end rests on the plate, an X-drive for this carriage in the direction of the longitudinal guide, via a first stepwise motor and endless screw unit, coming into engagement with a first runner connected to the end of the carriage, while the carriage in turn bears a Y drive in the transverse direction via second stepwise motor and endless screw unit coming into engagement with a second runner which is therefor capable of moving step by step in X and Y in a controlled manner, and the film holder unit is provided with support riders capable of sliding with a dry fit on the upper surface of the plate, whereas it is mounted solidly with the second runner horizontally at X and Y, and free vertically thereto.

According to the another feature of the invention, the film holder unit is capable of receiving two roll film unwinding and winding magazines while there are also provided in the plate two passages capable of being provided in their lower portion with two magazines of precut microfiches.

According to an equally important feature of the invention, in the shooting station, the plate is arranged so as to define beneath its flat upper surface a channel for the sliding in a controlled manner of a shooting window bearing carriage which comprises upwardly directed sawtooth pockets defining two positions for a window-bearing frame capable of supporting two different windows respectively while the window bearing frames each rest via four lateral studs in the pockets, two of these studs being longer than the others. Finally, four fixed vertical studs connected to the plate are provided, while the resting of two of the longer studs on two of the fixed studs causes one of the window bearing frames to rise on a sawtooth wall from its pockets to bring it into the shooting position.

Other features and advantages of the invention will be apparent from the following detailed description of a preferred embodiment and in the attached drawings.

DETAILED DESCRIPTION

Figure 1:
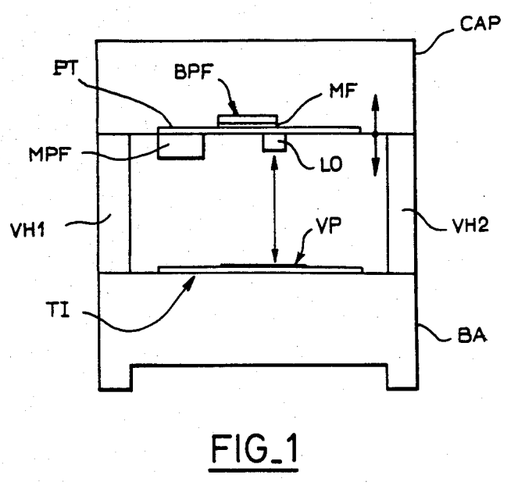
FIG. 1 schematically the general design of the camera according to the present invention.

FIG. 1 shows the frame BA of the camera. At the top, this frame is provided with a horizontal plate PT having a flat upper surface covered by a light-proof cover labelled CAP. Means for X-Y travel (not shown in FIG. 1) of a film holder unit BPF are provided inside the cover. The film holder unit is capable of holding a photosensitive film MF in the vicinity of the upper face of the plate parallel thereto by suction. In addition, the film holder unit BPF is movable in an indexed fashion so as to move the film above a shooting station arranged in the plate, above a main objective lens labelled LO which serves to take shots for the elementary micro-images of the microfiche it is understood immediately that the indexed travel of the film holder unit will permit a succession of elementary images arranged according to a partition to be imprinted on the film. This partition can be selected from various elementary image partitions admissible in microfiches.

A lower table T1 is provided at the bottom, capable if receiving a document to be reproduced labelled VP in a suitable position relative to the objective lens LO. The upper frame is vertically movable under the influence of a guide and drive device consistuted, for example, by jacks VH1 and VH2. The production of the movement of the upper frame by means of these jacks is considered as known to the skilled man.

FIG. 1 also shows a magazine MPF for storing photographic film which has been precut to the format of the microfiches. Another one which will receive the microfiches after the micro-images and the title have been imprinted is located behind this magazine.

Figure 2:
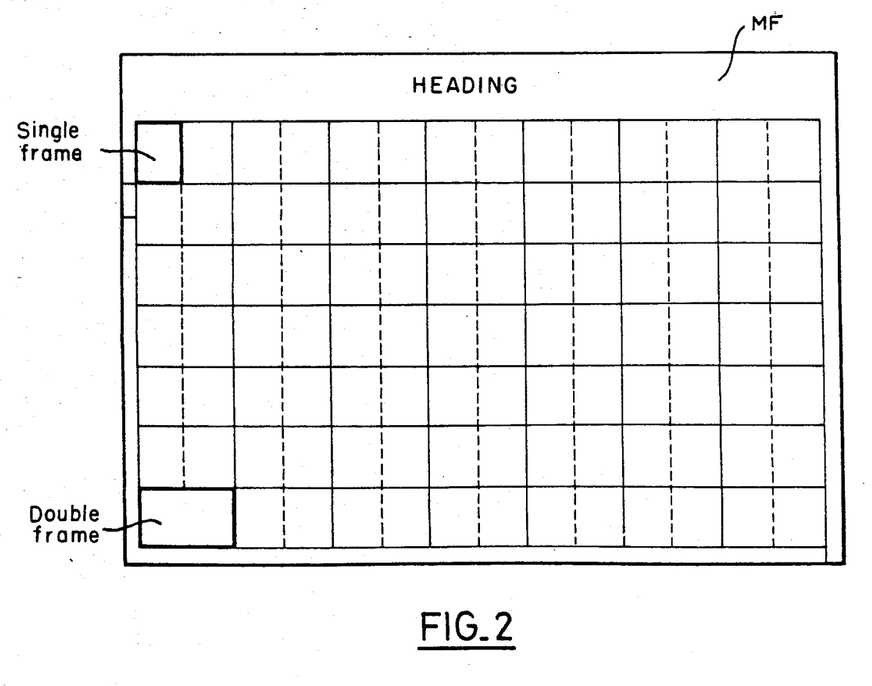
FIG. 2 shows schematically an example of the consititution of a microfiche.

FIG. 2 shows schematically a microfiche MF which comprises a heading portion as well as a micro-image portion. It can be seen immediately that these micro-images can be reproduced either with a single frame or with a double frame.

The microfiches are standardised to an A6 format measuring 148 mm × 105 mm. In the basis of this format, uniform partitions of 98 single shots or 49 double shots are used, or again 60 single shots or 30 double shots. Variable partitions with 32 single shots or 16 double shots are also used. Finally, in the case of documents which are edited on computer printers, partitions with 420 or 270 single shots (COM type partition) are also used.

FIG. 2 shows an example of a partition with 98 single shots or 49 double shots. It will also be remembered that it is desirable to be able to pass from a single frame to a double frame inside the same microfiche.

Figure 3:
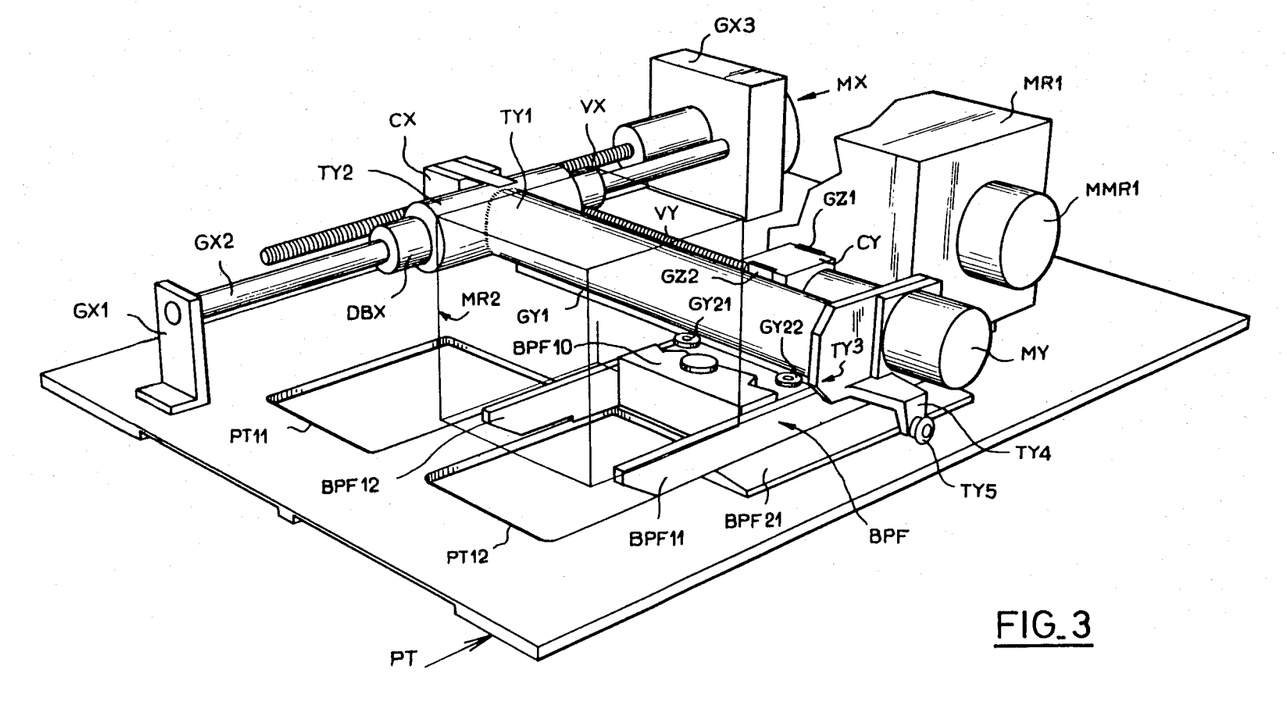
FIG. 3 is a perspective view illustrating the drive mechanism of the film holder unit.

FIG. 3 shows the film holder unit BPF drive device on the plate PT with its cover removed.

On the plate PT there is mounted a longitudinal guide or X guide constituted at one end by a right-angle GX1 fixed on the plate and at the other end by a vertical block GX3. Between these two portions is mounted a guide rod GX2 on which a carriage which has a general T shape and is constituted by a short longitudinal portion TY2 integral with a long transverse portion TY1 slides via two ball sleeves DBX. A runner nut CX which rests against an endless screw VX actuated by a stepwise motor MX connected to the block GX3 is located opposite the portion TY1. It can immediately be seen that the motor MX will be able to control a step by step movement of the carriage TY1, TY2 in the X direction.

At the other end of the long transverse part TY1 there is mounted a flange TY3 which supports a second stepwise motor labelled MY and which is provided at its lower portion with a right angle TY4 terminating with a caster TY5 capable of resting and running on the upper surface of the plate PT. The stepwise motor MY drives an endless screw VY parallel to the part TY1 of the carriage and on this endless screw VY slides a runner nut CY provided laterally with two slide guides GZ1 and GZ2 in which two slides connected to the film holder unit BPF travel with a vertical translation. Finally, a rail of vertically elongate rectangular cross-section, labelled GY1 and on either side of which small wheels such as GY21 and GY22 mounted on the film holder unit BPF engage is provided at the lower portion of the part TY1.

It is thus shown that the film holder unit BPF is mounted solidly with the second runner CY horizontally in X and in Y directions, but it is free vertically relative thereto.

Generally speaking, the film holder unit is constituted by a frame BPF 10 connected to two side stringers BPF 11 and BPF12 parallel to the X direction and beneath which there are mounted two support riders of which one, BPF21 is shown in FIG. 3. These support riders rest with a dry fit on the upper surface of the plate PT. A perforated plate permitting the photosensitive film to be held by suction in a manner known per se is mounted between the two riders.

In a particular embodiment, the plate PT is made of a light alloy which has a density of 2.8 and is non-corrodable, such as the one known as "Alumax". Once suitable orifices have been cut and the upper surface of the plate has been machined clean, the plate is subjected to a special heat treatment involving superficial application of a molybdenum based dry lubricant. For their part, the riders such as BPF21 are made of 90 kilo alloyed hard steel. It is currently believed that the coefficient of static friction and dynamic friction between the riders and the upper surface ofthe plate should be less than 0.30.

Other light alloys and other dry friction coatings can be considered, in particular titanium sulphide based coatings, provided that a sufficiently low coefficient of friction is maintained.

Under these conditions, and in a surprising manner, it has been found that excellent positioning of the film holder unit and of the film relative to the top surface of the plate can be achieved even though the X and Y drive mechanism is not directly connected to this film holder unit. It is mentioned in this respect that the vertical positioning should be effected with a precision of approximately 2/100 mm to promote constant readability of the images.

In an alternative embodiment of the plate, the plate can be made of other light materials, in particular synthetic materials suitably coated to fulfil the condition of low friction and of longevity for the dry friction travel of the film holder unit BPF on the upper surface of the plate.

Finally, FIG. 3 also shows two orifices PT11 and PT12 which serve for the passage of films which have been precut to the format of microfiches from a feeding magazine and a receiving magazine fixed below the plate and not shown here (one of the magazines is shown in FIG. 1).

The other method of film supply from a roll of film is also shown in FIG. 3, since two magazines MR1 and MR2, one being a feeding magazine and the other a receiving magazine, can be seen on the side members BPF 11 and BPF12 of the film holder unit. A film retaining device is provided on one of the magazines and a drive motor labelled MMR1 in FIG. 3 is provided on the other.

Electrical connections (not shown) couple the various motors to the stationary portion of the plate. Similarly, a pneumatic connection couples the suction plate of the film holder unit to the fixed portion of the plate.

Finally, some electrical devices which abut precisely on some X and Y guide devices so as to obtain positional references for the work of the stepwise motors are provided. These devices are, for example, precise optoelectronic detectors connected at the end of travel to electromechanical detectors which safely stop the operation of the stepwise motors.

Figures 4A, 4B, 4C:
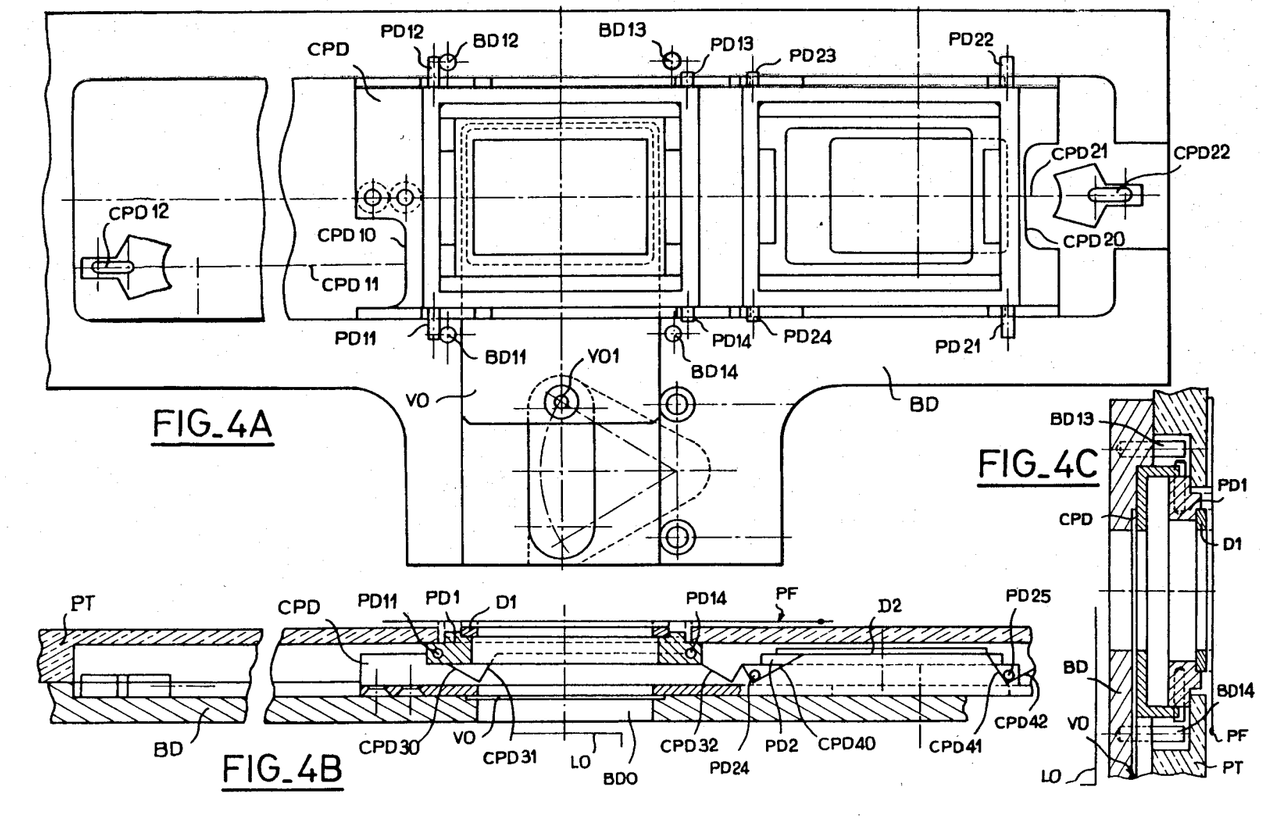
FIGS. 4A to 4C are three related views showing the design of the window bearing carriage in detail.

Reference will now be made to FIGS. 4A to 4C which show the window mechanism situtated beneath the plate PT directly above the main shooting position for the production of the micro-images.

FIGS. 4B and 4C show the rear face of the film shooting lens LO. Around this region, the lower face of the plate PT is notched so as to define a longitudinal channel which is closed at the bottom by a base BD. FIG. 4A simply shows a plan view of the base BD with the elements defining the window, the plate PT having been removed.

A window bearing carriage generally labelled CPD slides in the channel thus defined by the plate PT and the base BD. This carriage assumes the shape of an elongate frame of which the large sides are provided with upwardly directed sawtooth-shaped pockets. FIG. 4B shows a pocket defined by the ramp CPD30 and by the more pronounced ramp CPD31. Another pocket is defined by the ramp CPD32 parallel to the ramp CPD30 and followed by another ramp which is more pronounced in the opposite direction. Another pocket defined by a pronounced ramp followed by a ramp CPD40 symmetrical to the ramps CPD30 and CPD32 is again found immediately afterwards. Finally, in the right hand portion of FIG. 4B, a last pocket is defined by the ramp CPD41 followed by the pronounced ramp CPD42 parallel to the ramp CPD40. The other large side of the window bearing carriage CPD is equipped in the same fashion.

The pockets associated with CPD30 and CPD32 and the identical pockets located on the other side of the carriage define a window bearing frame position, this window bearing frame being labelled PD1. The frame in turn supports a window D1 corresponding, for example, to the single image format of the microfiche. The frame PD1 has on its side elongated studs PD11 and PD12 and shorter studs PD13 and PD14 which, in the absence of any other forces, position themselves on the bottom of the pockets CPD30 and CPD32. In the same way, another window bearing frame PD2 rests via its studs PD21 to PD24 on the bottom of the pockets defined by the ramps CPD40 and CPD41. This other frame PD2 supports another window D2 which corresponds, for example to the double format of the partition of the microfiche.

It will finally be observed that four vertical studs labelled BD11 to BD14 and illustrated in particular in FIG. 4A are provided symmetrically to the film shooting station. These studs are solid with the base BD. They will permit the positioning of one or other of the windows in the operating position.

To this end, the assembly of the carriage CPD is movable under the influence of the traction device comprising a rack and pinion coupled to a reduction motor (not shown). Opto-electronic devices CPD 12 and CPD22 are also provided for stopping the reduction motor at the end of the carriage travel.

In the position shown in FIGS. 4A and 4B, the right hand window bearer is in the operating position. It will be seen that the studs PD11 and PD12 but against the vertical studs BD11 and BD12, by means of which the window bearing frame PD1 is mounted on the ramps CPD30 and CPD32 so as to abut on the lower machined surface of the plate PT and thus bring the window flush against the upper surface of the plate, just beneath the film plane labelled PF.

The manipulation for exchanging the window (and therefor the partition) is very simple and it is merely necessary to initiate the travel of the carriage to the left, by means of which the window bearing frame PD1 redescends into its pockets, permitting it to pass back into the channel formed between the base BD and the plate PT. Once the other window bearing frame PD2 has advanced sufficiently far towards the left, its horizontally elongated studs PD21 and PD22 abut against the vertical studs BD13 and BD14 which will cause the window bearing frame PD2 to rise on the ramps CPD40 and CPD42 via its studs such as PD24 and PD25, after which it will in turn abut against the plate at the level of the film shooting station and will thus bring the other window D2 into the operating position.

Very accurate positioning of two windows of different size in the region of the micro-image shooting station is thus achieved in a simple manner.

FIG. 4A also shows a blocking shutter VO which is movable in a horizontal plane under the influence of a cam VO1, actuated by means which are not shown, to permit exposure.

Since this blocking device is situated in the actual interior of the plate, it is immediately found that the portion situtated beneath the plate can remain exposed to sufficient light for the operator to work.

The devices placed beneath the plate PT will now be described briefly with reference to FIGS. 5A and 5B. In the region of the main shooting station PVE there is placed the objective lens L0 already mentioned above which is mounted on a right angle L010 capable of sliding vertically via a slide L011 on another right angle L012 integral with the intermediate plate P1 parallel to the plate. A pivot L021 is also mounted on this right angle L012 and supports an arm L020 of which one end triggers via a micrometric thrust L022 vertical movement of the objective lens, while its other end is provided with a small wheel L023 actuated by a focusihg cam which is itself manipulated by a wire with one end connected to the fixed portion of the frame. This allows the position of the lens L0 to be adjusted as a function of the position of the upper frame in FIG. 1. Automatic focussing is thus achieved in a very simple manner.

Figures 5A, 5B:
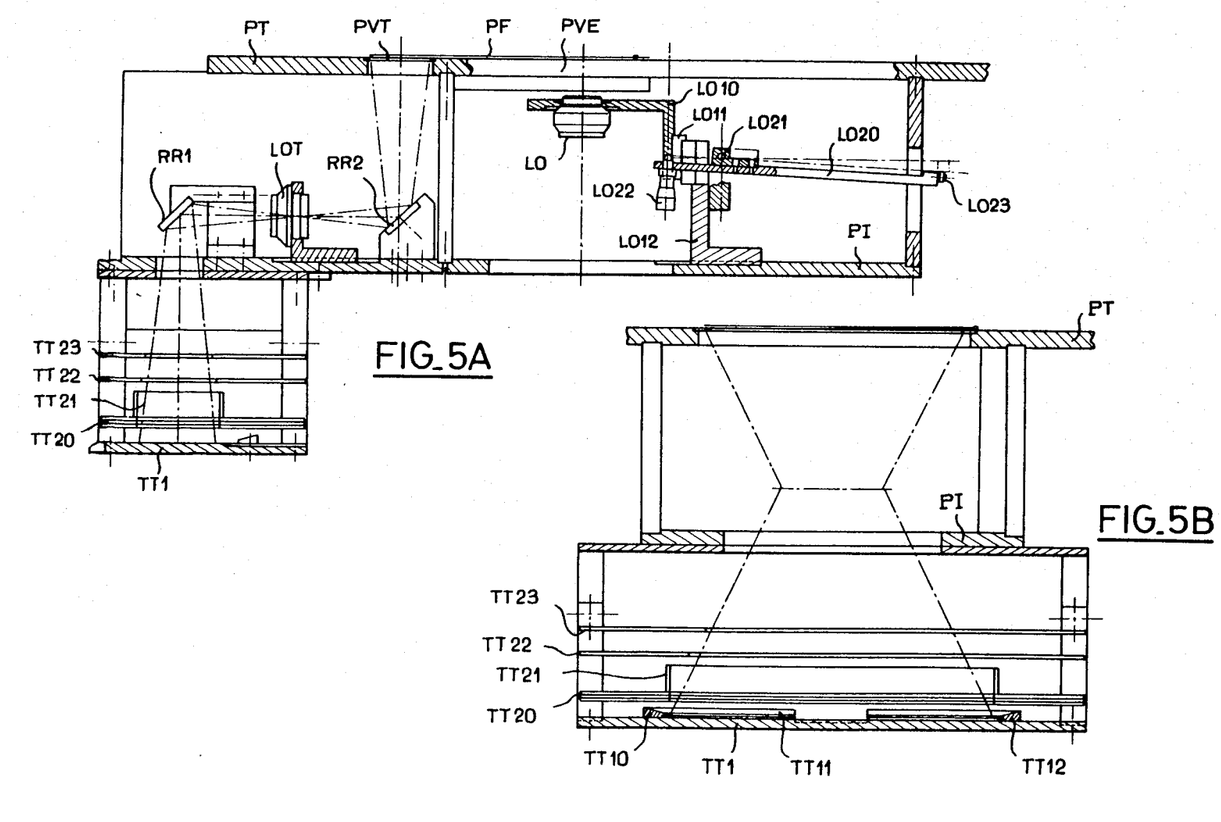
FIGS. 5A and 5B show the optical systems placed beneath the upper plate of the camera.

FIG. 5A also shows an auxiliary shooting station labelled PVT which allows shots to be taken for the title. A special table labelled TT1 received data which are to constitute the heading or title of the microfiche. This table TT1 is mounted under a lighting device and a suitable beam distribution system constituted by the parts TT20 to TT23. A reflector which extends transversely to FIG. 5A, labelled RR1, transmits the image from the heading strip to the heading lens LOT which is again followed by a return mirror RR2 which directs the image to the shooting station PVT.

FIG. 5B is a section through FIG. 5A along the optical axis of the optical title system. It makes it easier to understand the geometry of the members TT20 to TT23 and to see the device for the precise positioning of the title data by means of a rectangular frame defined by the parts TT10, TT11 and TT12.

Figure 6:
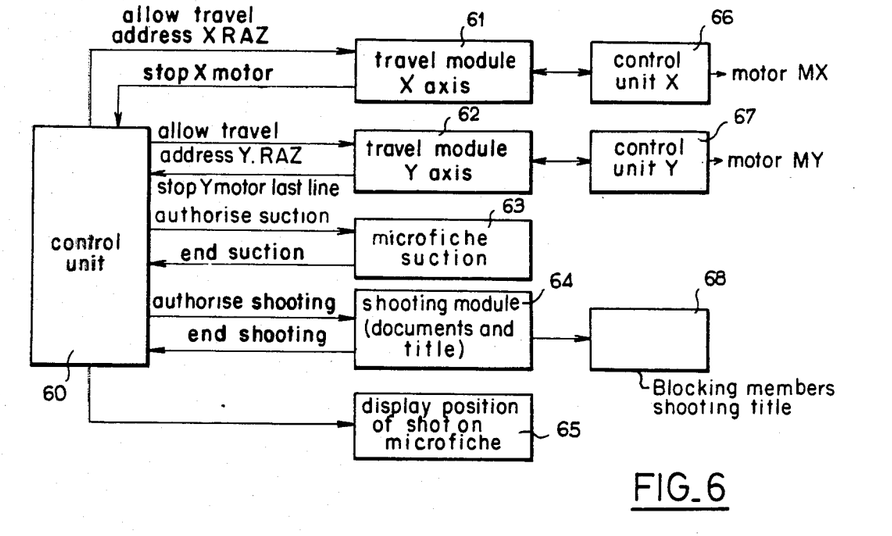
FIG. 6 is a diagram of the electronic circuits connected to the camera according to the invention.

FIG. 6 now shows a simplified diagram of the electronic members connected to the camera according to the invention.

Some units 66 and 67 serve as control units for the stepwise motors MX and MY respectively.

As a detailed embodiment, the motor MX can be the model 34 PMC 006 available in France from the Company SOCITEC. The motor MY which drives a smaller load can be the model 23 PMCH 302 available from the same Company. The control units 66 and 67 can thus be grouped in the device known as a "1055 current regulation translator" sold by the same Company. These motors operate at 200 steps per revolution and can be controlled for half steps and connected to a screw having a pitch of 5 mm and a diameter of 12 mm. The frequency of the steps of the motors is thus regulated to the maximum level of 13,333 Hz.

The units 66 and 67 are controlled by the modules for travel along the X axis and along the Y axis 61 and 62 respectively. They are subject to the instructions from the control unit 60 which transmits to them instructions enabling travel as well as address and resetting to zero at X for the module 61 and at Y for module 62. Conversely, these modules transmit data for stopping the motor X or for stopping the motor Y in the last column or in the last line in the direction of the control unit 60.

The control unit 60 also transmits instructions permitting suction or end of suction to a device 63 which controls the suction mechanism incorporated in the film holder unit. The control unit 60 again acts on the shooting module 64 for the documents and the title, transmitting to this module authorisation to take a shot and receiving from it a datum to end shooting. The module 64 acts on the blocking members 68 for taking shots and at the end of the microfiche for the title.

Finally, the control unit 60 controls a member 65 intended for displaying the position of the shot on the microfiche.

Figure 7:
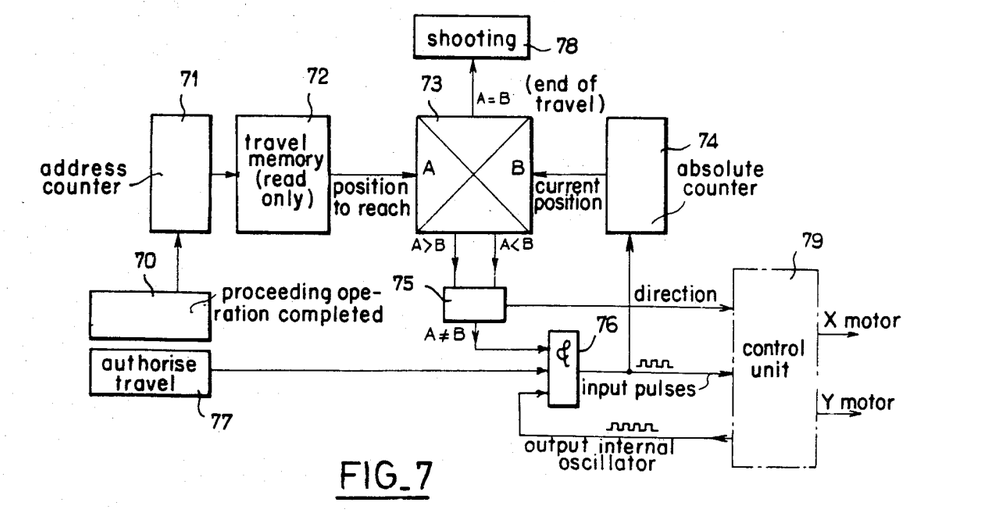
FIG. 7 is a more detailed electronic diagram showing the control of X and Y travel of the film holder unit.

Reference will now be made to FIG. 7 which shows schematically the design of one of the travel modules 61 and 62.

In this FIG. 7, a unit 70 defines a datum indicating that the preceding operation is completed. The excitation of this unit 70 causes an address counter 71 to advance and to actuate a read-only travel memory 72. The read-only travel memory 72 obviously depends on the partition to be effected in the microfiches. It can immediately be seen that a large number of partitions can be satisfied with a plurality of readonly memories. For each address which thus corresponds to the centre of the position of following micro-images, the travel memory 72 will define a position to be reached which has been labelled A in FIG. 7 and which is fed to a comparator 73.

During return from the unit 79 combining the units 66 and 67 in FIG. 6, the current position of the film holder unit, which is labelled B, appears on an absolute counter 74. The comparator 73 indicates to a unit 75 if A is higher or lower than B, the unit 75 thus defining a direction of travel for the control unit 79. It also defines a datum A which is different from B and is fed to an AND gate 76 also receiving from a unit 77 incorporated in the control unit authorisation to travel as well as from the control unit 79 the output of an oscillator intended to define the control frequency of the stepwise motors. If A differs from B, when travel is authorised, control pulses are fed via the output of 76 to the unit 79 which consequently actuates the motor X or the motor Y in the direction defined by the unit 75.

In this way, the value of B equal to A is rapidly reached in the absolute counter. At this moment, the travel of the relevant stepwise motor ends and a datum A equal to B is emitted via the comparator 73 to the device for enabling shooting 78 incorporated in the control unit 60.

This diagram in FIG. 7 shows very clearly that once the mechanical problems in the precise positioning of the film holder unit above the plate have been solved, a stepwise motor arrangement allows very simple adaptation to any type of partition on the microfiche by mere selection of the read-only memory 72.

The operations which occur for taking shots on a microfiche will now be described in detail with reference to the flowchart in FIG. 8.

Figure 8:
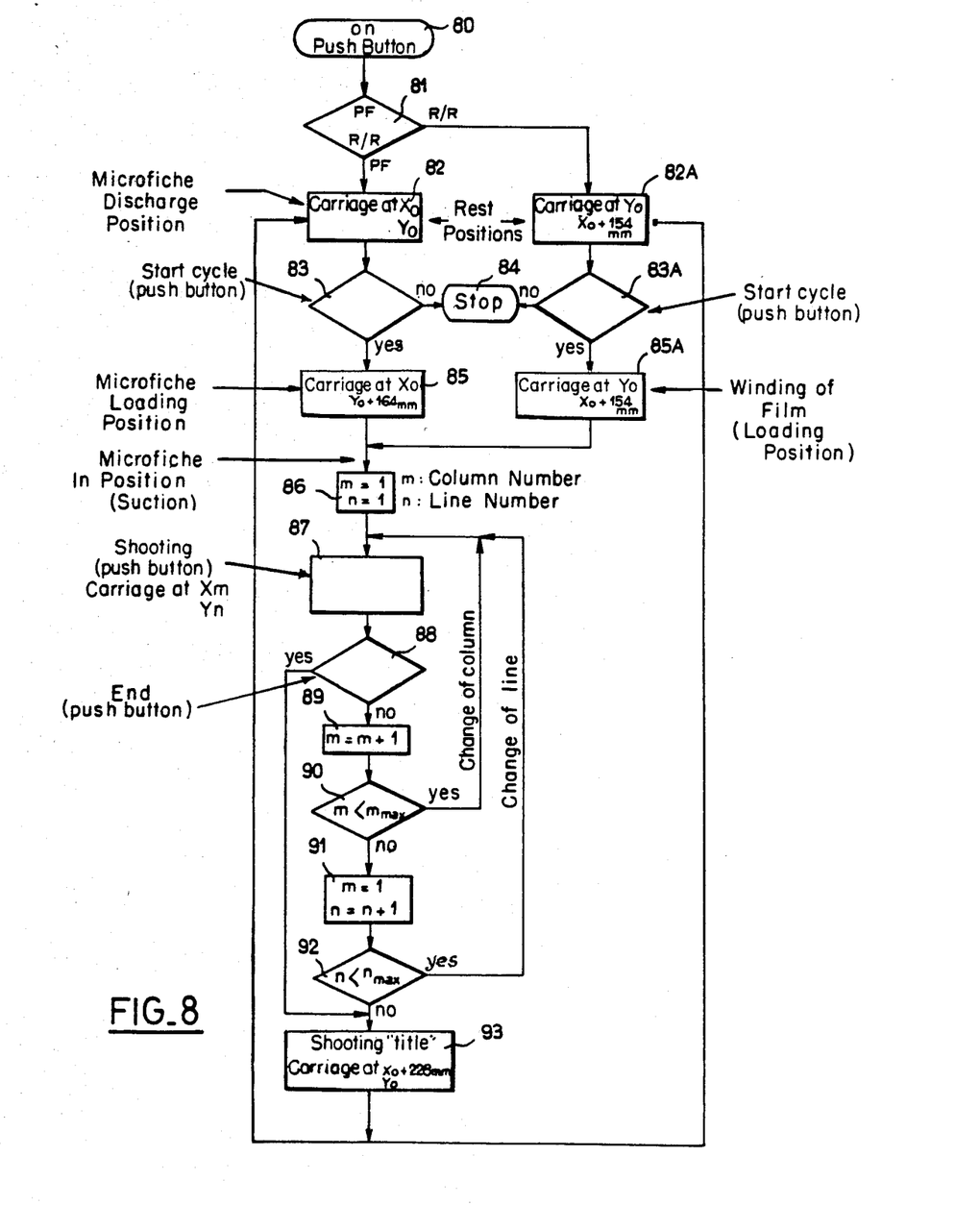
FIG. 8 is a flowchart showing how the sequence of shooting takes place relative to a given microfiche.

The operator firstly actuates an on/off button which is monitored and defines the first step 80 of the flowchart in FIG. 8.

After this, a test 81 occurs to examine whether the photosensitive film is supplied in a roll (R/R) or by precut microfiche (PF). If the film is precut, stage 82 is approached directly, bringing the film holder unit into the position for discharging the preceding microfiche onto the magazine for receiving already exposed microfiche. After this, the stage 83 waits until the operator actuates the button for starting the cycle. The device is at rest when this button is not actutated. As soon as the push button is actuated, the stage 85 brings the carriage into the position for loading an unexposed microfiche, which is labelled XO and YO+154 mm. The values XO and YO define positional references established in a manner known per se inside the electronic gadgetry.

After this, the microfiche is held in position by suction and the stage 86 defines a column number m equal to 1 and a line number n also equal to 1.

The stage 87 waits until the operator actuates the shooting push button and then brings the carriage to the position X and Y corresponding to the relevant m and n indices, depending on what is defined by the read-only travel memory 72 in FIG. 7. Before actuating the shooting button, the operator naturally places the document to be reproduced on the placement VP of the lower table T1 illustrated in FIG. 1, in a suitable position relative to the objective lens LO.

If the operator does not press "end", the test 88 will pass to 89 which involves incrementing the index m by one unit. The test 90 checks whether the index m is lower than the maximum value for the partition retained. If this condition is fulfilled, a return is effected to stage 87. If not, stage 91 passes to the following line n=n+1, resetting the column number to the value n=1. The test 92 then checks that the number of lines is lower than its maximum value. If this condition is confirmed, a return is made to stage 87. If not, stage 93 is adopted and involves taking shots for the title, bringing the carriage into the corresponding special position which is defined here by XO+228 mm and YO. The method of taking shots for the "title" is also carried out by operator push button control once a suitable title has been positioned on the table TT1 in FIG. 5A.

The variation in which the film is provided in a roll will now be examined. In this case, the output from the test 81 will go towards stage 82A which brings the carriage to YO and XO+154 mm. After this, test 83A waits until the beginning of the cycle has been indicated by a push buttom actuated by the operator. Once this actuation is confirmed, the stage 85A repeats the positioning of the carriage at YO and XO+154 mm after having wound the film so as to bring a quantity of unexposed film corresponding to the format of a microfiche right above the shooting position. After this, stage 86 and the following stages described above are repeated.

If it is necessary to exchange during operation the single format and double format of micro-images, the control unit 60 effects simple logic operations to determine whether there is sufficient room in the current line of micro shooting to place a double format microimage. If this is possible such an image will be taken once the central unit has triggered suitable travel of the window bearing carriage in the manner described with reference to FIGS. 4A to 4C.

Moreover, the address manipulations corresponding to the passage from a single format to a double format and vice versa can be solved in an elegant manner when addressing the travel memory 72 by means of very simple manipulations on the address bits under the control of the unit 60.

It can now be seen that the camera according to the present invention can pass from a single format to a double format virtually continuously for the operator.

On the other hand, exchange of partitions is also very simple since it is sufficient to exchange the travel memory 72 and to arrange two corresponding windows in the region of the window bearing system, which is effected by mere fitting on their support with access via the top of the plate PT.

It has also been seen that the camera according to the invention can process roll film just as well as film which has been precut to the format of the microfiches.

Finally, the arrangements in the present invention can easily be applied to a microfiche transposing camera or to a camera producing single shot microfiches providing that a special position and an additional optical system capable of operating on the entire microfiche at the same time are provided.

The present invention is obviously not limited to the embodiment described but covers any variation conforming to its basic concept.

What we claim is:

1. A microfiche camera arrangement comprising:
    a frame;
    a horizontal plate having a flat upper surface provided on the frame;
    a light proof cover covering said horizontal plate;
    a shooting station arranged in said horizontal plate;
    a film holder unit provided under said cover and above said horizontal plate and adapted to support a photosensitive film in the vicinity of the upper surface of said plate;
    first and second drive means for displacing said film holder unit in an indexed fashion above said shooting station along two horizontal perpendicular axes parallel to said upper surface of said horizontal plate, so as to allow the impression on the photosensitive film of a succession of elementary images arranged according to a partition selected from various elementary image partitions,
    said first drive means including:
        a longitudinal guide connected to said horizontal plate,
        a transverse carriage comprising a first runner supported by said longitudinal guide, and
        a first driving assembly coming into engagement with said first runner so as to displace said transverse carriage along said longitudinal guide,
    said second drive means including:
        a second runner provided on said transverse carriage and capable of displacement along said transverse carriage perpendicularly to said longitudinal guide, and
        a second driving assembly engaging said second runner so as to displace said second runner along said transverse carriage, perpendicularly to the longitudinal guide;
    means for mounting said film holder unit on said second runner vertically free relative thereto; and
    support riders provided on said film holder unit and capable of sliding with a dry fit on the upper surface of the plate.

2. An arrangement according to claim 1 wherein each driving assembly comprises a stepwise motor and an endless screw, said endless screw engaging the associated runner.

3. An arrangment according to claim 1 wherein said film holder unit is adapted to receive two magazines which unwind and wind roll film respectively.

4. An arrangement according to claim 3 further comprising two precut microfiche magazines supported by said horizontal plate in regard of two passages provided thereto.

5. An arrangement according to claim 1 wherein in the region of said shooting station, said horizontal plate is arranged so as to define beneath its flat upper surface a channel in which a window-bearing carriage slides in a controlled manner, said carriage comprising upwardly directed saw tooth pockets defining two positions for window bearing frames capable of supporting two different windows respectively, while the window bearing frames each rest via four lateral studs in said pockets, two of these lateral studs being longer than the others, and wherein there are provided four fixed vertical studs connected to the horizontal plate, so that the resting of two of said longer lateral studs on two of said fixed vertical studs causes one of said window bearing frames to rise on a saw tooth wall from its pockets to bring it into the shooting position.

6. An arrangement according to claim 5 further comprising a shutter which is movable transversely to the window bearing carriage.

7. An arrangement according to claim 1 wherein the horizontal plate is vertically movable upon the frame and wherein the shooting station comprises a lens for taking elementary shots on the microfiche, said lens being connected to an automatic focusing assembly controlled by the position of the movable upper frame supporting the plate.

8. An arrangemeent according to claim 1 wherein an auxiliary shooting station, optical system, and title table are provided to effect title shots.

9. A microfiche camera arrangement comprising:
    a frame;
    a horizontal plate having a flat upper surface provided on said frame;
    a light proof cover covering said horizontal plate;
    a shooting station arranged in said horizontal plate;
    a film holder unit provided under said cover and above said horizontal plate and adapted to support a photosensitive film in the vicinity of the upper surface of the plate;
    first and second drive means for displacing said film holder unit in an indexed fashion above said shooting station along two horizontal perpendicular axes parallel to said upper surface of the horizontal plate, so as to allow the impression on the photosensitive film of a succession of elementary images arranged according to a partition selected from various elementary image partitions,
    wherein said first drive means includes:
        a longitudinal guide connected to said horizontal plate,
        a transverse carriage comprising a first runner and having a first end supported by said longitudinal guide and a second end supported by the horizontal plate, and a first driving assembly comprising a first stepwise motor and a first endless screw, said first endless screw coming into engagement with said first runner so as to displace said transverse carriage along said longitudinal guide when said first stepwise motor is actuated, and wherein the second drive means includes:

a second runner provided on said transverse carriage and capable of displacement along said transverse carriage perpendicularly to said longitudinal guide, and a second driving assembly supported on said transverse carriage, comprising a second stepwise motor and a second endless screw, said second endless screw engaging said second runner so as to displace said second runner along said transverse carriage when the second stepwise motor is actuated;

means for mounting said film holder unit on said second runner vertically free relative thereto; and support riders provided on said film holder unit and capable of sliding with a dry fit on the upper surface of the plate.

* * * * *